US012267943B2

(12) United States Patent
Consoli et al.

(10) Patent No.: US 12,267,943 B2
(45) Date of Patent: Apr. 1, 2025

(54) METHOD FOR GENERATING HIGH INTENSITY ELECTROMAGNETIC FIELDS

(71) Applicant: ENEA AGENZIA NAZIONALE PER LE NUOVE TECNOLOGIE, L'ENERGIA E LO SVILUPPO ECONOMICO SOSTENIBILE, Rome (IT)

(72) Inventors: Fabrizio Consoli, Catania (IT); Riccardo De Angelis, Grottaferrata (IT); Pierluigi Andreoli, Latina (IT); Mattia Cipriani, Monte Compatri (IT); Giuseppe Cristofari, Palestrina (IT); Giorgio Di Giorgio, Rome (IT)

(73) Assignee: ENEA AGENZIA NAZIONALE PER LE NUOVE TECNOLOGIE, L'ENERGIA E LO SVILUPPO ECONOMICO SOSTENIBILE, Rome (IT)

( * ) Notice: Subject to any disclaimer, the term of this patent is extended or adjusted under 35 U.S.C. 154(b) by 443 days.

(21) Appl. No.: 17/632,674

(22) PCT Filed: Aug. 7, 2020

(86) PCT No.: PCT/IB2020/057464
§ 371 (c)(1),
(2) Date: Feb. 3, 2022

(87) PCT Pub. No.: WO2021/024226
PCT Pub. Date: Feb. 11, 2021

(65) Prior Publication Data

US 2022/0287171 A1 Sep. 8, 2022

(30) Foreign Application Priority Data

Aug. 8, 2019 (IT) ........................ 102019000014385

(51) Int. Cl.
*H05H 7/02* (2006.01)

(52) U.S. Cl.
CPC ........... *H05H 7/02* (2013.01); *H05H 2242/24* (2021.05)

(58) Field of Classification Search
CPC ........ H05H 7/02; H05H 7/08; H05H 2242/24; H05H 2007/046; H05H 15/00
(Continued)

(56) References Cited

U.S. PATENT DOCUMENTS

2008/0191143 A1 * 8/2008 Willi ...................... G21K 1/087
250/396 ML

OTHER PUBLICATIONS

Zhai et al., Proton Array Focused by a Laser-Irradiated Mesh, 2019, Appl. Phys. Lett. 114, 013509. (Year: 2019).*

(Continued)

*Primary Examiner* — Jason L McCormack
(74) *Attorney, Agent, or Firm* — Amster, Rothstein & Ebenstein LLP

(57) ABSTRACT

A method of generating electromagnetic fields comprises the step of using the interaction between a laser source and an appropriate target, as the source for generating high-intensity electromagnetic fields. A strong positive charge is generated in the target hit by the laser. The target has a structure consisting of at least two different elements. The method can be used to obtain the acceleration, deceleration, deflection, focusing or selection of moving charges. Such charges have been previously accelerated by a completely separate process, and therefore the two processes of pre-acceleration and subsequent processing of the beam of particles are completely separate and therefore separately tunable and optimizable Such electromagnetic fields can be used in other fields than those previously indicated, such as—merely by way of example—medicine, biology, studies
(Continued)

on materials, electromagnetic compatibility, and generation of terahertz radiation.

9 Claims, 7 Drawing Sheets

(58) Field of Classification Search
USPC ....................................................... 250/492.3
See application file for complete search history.

(56) References Cited

OTHER PUBLICATIONS

Geng et al., Dual-Frequency Brillouin Fiber Laser for Optical Generation of Tunable Low-Noise Radio Frequency/Microwave Frequency, 2008, Optics Letters, vol. 33, No. 1, pp. 16-18. (Year: 2008).*
International Search Report and Written Opinion Received for the PCT Application No. PCT/IB2020/057464, mailed on Nov. 4, 2020, 15 pages.
Zhai et al., Proton Array Focused By A Laser-Irradiated Mesh, Applied Physics Letters, AIP Publishing LLC, vol. 114, No. 1, Jan. 8, 2019, 5 pages.
Kar et al., Guided Post-Acceleration of Laser-Driven lons by a Miniature Modular Structure, Nature Communications, vol. 7, No. 1, Apr. 18, 2016, 7 pages.
Consoli et al., Generation of Intense Quasi-Electrostatic Fields Due To Deposition of Particles Accelerated by Petawatt-Range Laser-Matter Interactions, Scientific Reports, vol. 9, No. 1, Jun. 12, 2019, 14 pages.
Kar et al., Dynamic Control of Laser-Produced Proton Beams, Physical Review Letters, vol. 100, No. 10, Mar. 14, 2008, 4 pages.

* cited by examiner

METHOD FOR GENERATING HIGH INTENSITY ELECTROMAGNETIC FIELDS

CROSS REFERENCE TO RELATED APPLICATIONS

This application claims benefit under 35 U.S.C. § 371 to international application No. PCT/IB2020/057464 filed on Aug. 7, 2020, which claims priority to French application No. IT 102019000014385 filed on Aug. 8, 2019, the contents of which are incorporated by reference in their entireties.

FIELD OF THE INVENTION

The present invention relates to the generation of high-intensity electromagnetic fields, with rapid rise times and which can be distributed on great volume extensions, obtained due to the fast charging of a material hit by a high-intensity and energy laser.

KNOWN PRIOR ART

The generation of high-intensity electromagnetic fields, with features which can comprise stationarity over a certain time interval, creation and neutralization in short time, and application on large extensions of volume and area, is a research topic of considerable interest in the international scientific community and with wide possibilities of application.

High-intensity electric fields can be sustained only under vacuum, otherwise the ionization effects of air or other dielectrics create known breakdown phenomena, with the consequent neutralization of the fields which produced them.

Among the various possible applications, a classic use in a general sense of such fields is for the acceleration of charged particles by Coulomb's law.

Specifically, by using "capacitor" structures, i.e., in which the electric field region is delimited by parallel conductive surfaces, often replaced by conductive grids. These structures can be used in a typical acceleration/deceleration diagram of charged particles, where the field is parallel to the preferential direction of acceleration and therefore serves to increase/decrease the speed thereof (see FIG. 1*a*), or in a deflection diagram, in cases where the field has a normal predominant component in the preferential acceleration direction (see FIG. 1*b*).

Such devices are classically applied to accelerated particle beams, whether they are continuous or pulsed, low or high energy.

The use of such structures as "deflectors" (or "Choppers") is important in a particle accelerator in order to prevent the accelerated particle beam from hitting the target on command, instead directing it towards a "beam-dump".

Both diagrams in FIG. 1 consider the classic diagram of a capacitor on which a charge is applied at a certain instant, which is the source of an associated electric field in the space between the plates of the capacitor. A particle beam entering the area delimited by the two plates will undergo an acceleration due to this electric field and will therefore be accelerated/decelerated/deflected.

The diagram is obviously applicable only if the capacitor is already charged when the particle beam passes therethrough, and if it maintains the charge thereof for the entire time the beam passes between the capacitor plates.

This scenario is advantageous if the deflection process occurs statically, and therefore the capacitor can be charged even over long periods. If, on the other hand, the process concerns the consecutive passages of several beams, temporally for example in a periodic manner, there are known difficulties due to the capacitor charge/discharge process, which limit the applicability of the method only to a few cases with low repetition frequency.

Limiting the focus to the classic case of a DC voltage generator charging a capacitor for the moment, the problems are due to the following three factors.

1) Maximum electromotive force of the generator: in order to generate high electric fields E=v/d between the capacitor plates (with "E" electric field, "V" voltage applied and "d" distance between the plates), it is necessary to have generators with high output voltage "V", with the same distance "d"; this often arises as a strong technological limit.

2) Time constant of the charge-discharge circuit: one of the most delicate parameters, often the bottleneck of the problem. If a Cload capacitor must be charged, it must be done through a suitable network formed for example by a cable, with known characteristic parameters; for example, a classic RG58-Belden cable, has as nominal distributed parameters Cc=77 pF/m, Lc=200 nH/m, Rc=10.8 ohm/km. One meter of cable is already sufficient to add an important charge impedance to the capacitor to be charged. It suffices to say that a classic capacitor with circular plates 10 cm in diameter placed 10 cm away from each other under vacuum, has a Cload capacity=0.7 pF, much lower than that of the cable. The equivalent capacitor seen from the generator is the parallel between the two, i.e., 77.7 pF. In practice, the problem of charging the small Cload capacitor becomes that of charging the large Cc+Cload capacitor. It is therefore necessary to provide a total charge equal to 100 times that which would be necessary to charge only the Cload taken individually, to ensure that the voltage applied thereto—and therefore the relative electric field—is that desired. Furthermore, this situation will only occur when fully operational, i.e., after the end of the transient phase, the duration of which depends on the features of the equivalent RLC model of the network.

3) Maximum current suppliable by the voltage generator. Although the circuit is optimized to overcome the second point, the technological limitation posed by the maximum current which the voltage generator can supply is very important when low charging times are required. This fact affects the application of the method in many cases. To try to overcome this problem, the diagram in FIG. 2 is often used. The capacitor to which a high charge current is to be supplied is indicated with C2. The voltage generator VCC charges the auxiliary capacitor C1, which in this diagram only acts as an accumulator, delivering the maximum current Imax thereof, in the most favorable cases of around tens of mA. The switch INT is initially open. After a time interval dictated by the time constant given by the capacitance of C1 and the equivalent impedance Z1, on C1 the voltage VCC and the charge Q=C1*VCC will be in steady state. Since the generator VCC can supply a modest maximum current, it is unable to supply the high current which is required when the switch INT is closed at high speed. It can therefore be considered an "open circuit" in this transient, and therefore the impedance Z1 will be disconnected. If the capacitance of the capacitor C1 is large, the charge accumulated thereon will also be high, and will transfer to the capacitor C2 with a characteristic time which depends on the equivalent impedance of the associated RLC circuit. At steady state, the charge on C2 will be a portion of that on C1, but if C1 is very large the charge on C2 can be very high, and therefore give rise to voltages on C2, and thus electric fields of a high entity, and sufficient to obtain deflections even for very energetic particle beams. More energetic beams have higher speeds and therefore a shorter residence time inside the deflecting region delimited by the exemplary capacitor in FIG. 1, thus requiring higher applied voltages with the same deflection. Further switching the switch INT will cause the discharge of the capacitor C2, according to a suitable time constant determined by the features of the circuit.

This charging and discharging process is limited by the impedances Z1 and Z2, by the capacitors C1 and C2, by the maximum voltage VCC and by the maximum current which can be supplied by the voltage generator. Currently, deflectors are used which operate with kHz frequency, with very complex circuits, as described in A. Caruso, F. Consoli, G. Gallo, D. Rifuggiato, E. Zappalà, A. Longhitano, M. Di Giacomo, "The LEBT Chopper for the SPIRAL2 Project", Proceedings of the 2nd International Particle Accelerator Conference (IPAC 2011), 4-9 Sep. 2011, San Sebastian, Spain. ISBN 978-92-9083-366-6.

To solve these problems, especially when working with high-energy beams, advanced methodologies use voltages to be applied to the capacitor which are not constant but sinusoidal, or even with different time profiles. This is true both in the cases historically used for acceleration/deceleration and in the more modern cases of deflection. There are several examples in the sinusoidal accelerators, such as Cyclotrons, Linacs, etc. For Choppers which must operate at high energy, such as the Chopper 500, having a capacitance of 7 pF and present at the Southern National Laboratories of the INFN in Catania, sinusoidal driving signals are used and 170 nC of charge are sufficient to impress high energy, high mass and charge ions (typical energy of tens of MeV, masses even up to 58 amu and charges+19) transverse accelerations adequate for sufficient deflections, as explained in A. Caruso, et al, "Chopper 500 Status Report", Proceedings of the 17th International conference on Cyclotrons and their Applications, 18-22 Oct. 2004, Tokyo, Japan.

The most performing deflecting structures for high energy ions are those which allow a pseudo-Gaussian voltage pulse to be propagated along a transmission line, with a phase velocity equal to the beta parameter of particle propagation, and perfectly synchronized in time with the passage of the beam. On the basis of this, in the propagation path thereof towards ground the associated charge wave generates, at the point of the transmission line section where it is at a certain instant, a normal electric field in the direction of the beam. This field deflects the beam during propagation, inside the deflecting section consisting of the transmission line itself, due to the time synchronism thereof and to the fact that they are both with the same speed, as explained in:

M. Di Giacomo, A. Caruso, G. Gallo, E. Zappalà, D. Rifuggiato, A. Longhitano, F. Consoli, "Measurements of the first prototype of the Spiral2 Single Bunch Selector", Proceedings of the 3rd International Particle Accelerator Conference, 20-25 May 2012, New Orleans, Louisiana, USA. ISBN 978-3-95450-115-1, M. Di Giacomo, P. Balleyguier, F. Consoli, A. Caruso, A. Longhitano, "Experimental determination of impedance and delay time of the 100 ohm meander transmission line for the SPIRAL2 single bunch selector", Proceedings of the 2nd International Particle Accelerator Conference, 4-9 Sep. 2011, San Sebastian, Spain. "IPAC 2011", ISBN 978-92-9083-366-6, F. Consoli, A. Caruso, G. Gallo, D. Rifuggiato, E. Zappalà, M. Di Giacomo, "RF design of the power coupler for the SPIRAL2 Single Bunch Selector", Proceedings of 2011 Particle Accelerator Conference, 28 Mar.-1 Apr. 2011, New York, NY, USA, and F. Consoli, P. Balleyguier, M. Di Giacomo, "Broadband electromagnetic characterization of a 100 ohm travelling-wave electrode by measuring scattering parameters", Physical Review Special Topics—Accelerators and Beams Vol, 16, page 072001-1-072001-9, 2013.

The above allows to understand the most important technological limitations in order to create an adequate deflecting field in the capacitor. The sudden creation and cancellation of a field in the capacitor requires the rapid charging and discharging thereof, which is difficult to accomplish with voltage generators or even capacitors as in the case in FIG. 2.

To create an impulse which propagates along a transmission line as described in the previous documents to Di Giacomo and Consoli, very fast, high-power voltage generators must be used. In general, the fast generation of high electric fields in the desired area requires fast charge accumulation in the same area.

To solve some of these problems, pulsed power systems are used, described for example in:

W. Zhang, J. Sandberg, "Pulsed Power Systems in Large Accelerator Complex", Proceedings of the 3rd Japan-US Symposium on Pulsed Power and Plasma Applications, Kauai, Hawaii, Aug. 6-Aug. 8, 2006;

Giuseppe Maffia, Alessandro Lampasi, Pietro Zito, "A New Generation of Pulsed Power Supplies for Experimental Physics Based on Supercapacitors", Proceedings of the 15th IEEE International Conference on Environment and Electrical Engineering (EEEIC), 10-13 Jun. 2015, Rome, Italy, and P. D. Pearce, PULSED POWER FOR FUTURE LINEAR ACCELERATORS, Proceedings of the IEE Symposium on Pulsed Power '99 (Digest No. 1999/030), 15-14 Apr. 1999, Pembroke College, Oxford University, UK.

They generally employ methodologies of several cascaded blocks and provide voltages around tens of kV, with currents of different kA and rise/fall times which are generally around milliseconds, as described in R. Péron, F Bordry, J P. Burnet, F. Boattini, "A 60 MW pulsed power supply for particle accelerator: preliminary test results", Proceedings of the conference: EPE-PEMC 2010, Ohrid, Republic of Macedonia, September 2010, or even greater as described in the Maffia's document. In some cases, the values can also fall within the range between tens and hundreds of nanoseconds as described in:

B. M. Novac et al, "A 10-GW Pulsed Power Supply for HPM Sources", IEEE TRANSACTIONS ON PLASMA SCIENCE, VOL. 34, NO. 5, October 2006, T. Takayanagi et al, "DEVELOPMENT OF A NEW PULSED POWER SUPPLY WITH THE SiC-MOSFET", Proceedings of 2017 IPAC, Copenhagen, Denmark 2017, D. B. Reisman et al, "Pulsed power accelerator for material physics experiments", Physical review special topics—accelerators and beams 18, 090401 (2015), and J. N. Downing et al, "PULSED POWER SYSTEMS FOR THE DARHT ACCELERATORS", Proceedings of the Eighth IEEE International Pulsed Power Conference, Jun. 17-19, 1991, San Diego, CA.

However, they are generally very bulky structures as shown in Reisman and Downing, especially when they relate with high voltages and currents, and short times.

Regardless, the pulses generated have rising times which do not fall below ten nanoseconds, especially in terms of the generation of high electric fields.

As known, the most modern particle acceleration approaches employ high-intensity, high-energy pulsed lasers, and therefore the accelerated particles are naturally synchronized with such laser pulses. The post-acceleration and conditioning of these beams therefore requires the absolute synchronization of the previously discussed acceleration-deceleration-deflection apparatuses with the pulse of the same laser, and this is a technological limit which is difficult to solve for the devices used up to now.

It is known that the interaction of a high-intensity laser with a solid target generates a plasma and fast electrons associated therewith, which move away from the target in very short time, as described in Atzeni, S., Meyer-ter-Vehn, J., “The Physics of Inertial Fusion: Beam Plasma Interaction”, Hydrodynamics, Hot Dense Matter (Oxford University Press, 2009), and in Macchi, A., Borghesi, M., Passoni, M., “Ion acceleration by super intense laser-plasma interaction”, Rev. Mod. Phys. 85, 751 (2013).

These electrons create a high-intensity local electric field, capable of accelerating the ions in turn. These ions are much slower than electrons, and therefore globally the target—be it dielectric or conductor—shows a strong positive charge once hit by the laser, which can generally decrease over time.

It has been shown that the presence of such a sudden and high positive charge located at the point of laser-matter interaction can drive an electronic neutralization current through the target support, which is itself connected to the conductive vacuum chamber, as described in:

Dubois, J.-L. et al., “Target charging in short-pulse-laser-plasma experiments”, Phys. Rev. E 89, 013102 (2014), Poyé, A. et al., “Dynamic model of target charging by short laser pulse interactions”, Phys. Rev. E 92, 043107 (2015), Poyé, A. et al., “Physics of giant electromagnetic pulse generation in short-pulse laser experiments”, Phys. Rev. E 91, 043106 (2015), and Poyé, A. et al., “Thin target charging in short laser pulse interactions”, Physical Review E 98, 033201 (2018).

In the documents T. Toncian, et al “Ultrafast laser-driven microlens to focus and energy-select mega—electron volt protons” Science 312, 410 (2006) and T. Toncian, et al, “Properties of a plasma-based laser-triggered micro-lens”, AIP Adv. 1, 022142 (2011), it has been shown how this charge effect, applied to a cylindrical micro-target, can be used to create a focusing electric field in a structure which acts as a micro-lens for a particle beam accelerated by laser-matter interaction. A patent application has also been deposited on this diagram: M. Borghesi, T. Toncian, “Laser irradiated hollow cylinder serving as a lens for ion beams”, WO 2006/097252 A1.

SUMMARY OF THE INVENTION

The present invention relates to the generation of high-intensity electromagnetic fields. This phenomenon is caused by the extraction of electrons from material as a result of the laser-matter interaction, and allows a large amount of electric charge to be obtained thereon in very short time, comparable to the duration of the laser pulse used. This rapid mechanism can be used for the creation of high-intensity electric fields with very steep rising edges even on large volumes of space by exploiting structures similar to capacitors or transmission lines, even allowing to have high fields on structures of the type indicated in series. The connection of this structure to suitable RLC circuits allows to have oscillating fields with features which can be adjusted as needed, by intervening on the values of the circuit elements used. The solution suggested herein shows the versatility thereof for the generation of electromagnetic fields which are 1) stationary with a rapid rise time; 2) high-intensity sinusoidal; 3) traveling wave.

This means using the laser-matter interaction as a source for the generation of high-intensity microwave-radiofrequency electromagnetic fields, which can be used in a wide range of applications, in particular as regards the acceleration/deceleration/deflection/focusing/selection of accelerated charges.

The peculiar and important features of field generation produced by this technique allow the use of the same in a range of further applications which can be very wide and multidisciplinary. In particular, such high-intensity transient electric fields with a wide spatial extension can be used for biological and medical studies when applied to cells, or for the characterization of materials and devices subjected to high transient fields, for general electromagnetic compatibility studies as well as in evolved structures which generate radiations in terahertz.

The present invention relates to a method of generating electromagnetic fields comprising the step of using interaction between a laser source and a target, as the source for generating high-intensity electromagnetic fields, in which a strong positive charge is generated in the target hit by the laser. The target has a structure consisting of at least two discrete objects, of which at least one of the two is a conductor, and in which the target structure is used to obtain the acceleration or deceleration or deflection or focusing or selection of moving charges, or even the whole of more than one of the preceding actions.

In particular, in the method of generating electromagnetic fields according to the present invention, the beam of charged particles on which the electromagnetic fields act, has been accelerated by a laser-matter interaction, which is different from that used to generate the electromagnetic fields, or by methods of accelerating particles, which use principles other than the laser-matter interaction, and thus in which the two processes of pre-acceleration and subsequent processing of the particle beam are completely separate and therefore separately tunable and optimizable.

In particular, the electromagnetic fields generated are almost stationary and with microwave radiofrequency, and the material directly hit by the laser is a dielectric or a conductor.

In various embodiments, the step of introducing adjustable or tunable RLC networks is provided to allow obtaining high-intensity electromagnetic fields, which are stationary with a rapid rise time or with a periodic time trend, or with a traveling wave.

The high-intensity electromagnetic fields generated by the laser-matter interaction have very rapid rise times, and are obtained due to the fast charging of a material of the target hit by a high-intensity and energy laser beam and to the extraction of electrons from the material of the target following the laser-matter interaction.

Furthermore, in various embodiments, there is provided the step of using tunable capacitor or transmission line structures to have electromagnetic fields with uniform and non-uniform spatial distributions.

Furthermore, there is provided the step of using tunable connections with convenient RLC circuits in order to obtain electromagnetic fields, from the aforesaid structures, with adjustable time features by acting on the values of the circuital elements used in said RLC circuits.

In different embodiments, there is provided the step of using the aforesaid structures in cascade in order to obtain electromagnetic fields in each structure, which are synchronized with the other structures, but having an intensity and spatial profile which may be different.

Finally, in some embodiments, there is provided the step of using the fields generated for a set of applications belonging to other fields than those indicated in the preceding claims, such as medicine, biology, studies on materials and devices, electromagnetic compatibility, and generation of terahertz radiation.

BRIEF DESCRIPTION OF THE DRAWINGS

Further features and advantages of the invention will become apparent from the following description provided by way of non-limiting example, with the aid of the Figures shown in the accompanying drawings, in which:

FIG. 1(*b*) shows a diagram of the "capacitor" deflector;

Figure 1:
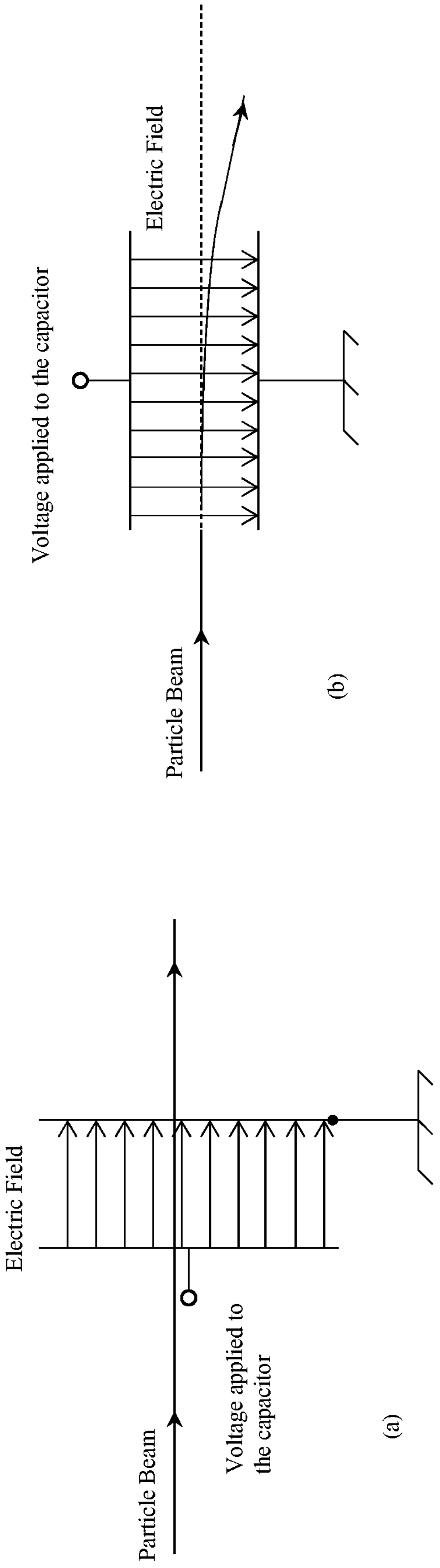
FIG. 1(*a*) shows a "capacitor" acceleration diagram of a beam of positive particles; in the case of a decelerator the electric field is reversed.

The parts according to the present description have been depicted in the drawings, where appropriate, with conventional symbols, showing only those specific details which are pertinent to the understanding of the embodiments of the present invention, so as not to highlight details which will be readily apparent to those skilled in the art, with reference to the description presented herein.

DETAILED DESCRIPTION OF THE INVENTION

The solution suggested and described here differs from Borghesi's document and Toncian's publications for the reasons set out below.

- The solution described herein applies to structures with a considerably different and "multitudinously connected" shape, with much larger dimensions. This allows to have much larger spatial regions affected by the electromagnetic fields generated by the process.
- The suggested structures are suitable for cascading, with electromagnetic field profiles which can be different for each of the cascade structures, in terms of intensity, dimensions of the spatial regions involved and spatial profiles of the field therein (uniform, non-uniform, with profiles designed ad hoc), without this significantly influencing the others in the cascade.
- The use of suitable adjustable or tunable RLC networks allows to obtain both stationary electromagnetic fields with rapid rise time and high-intensity sinusoidal fields.
- The possibility of using structures which are always multiply connected as transmission lines, where a short charge pulse is to be propagated, for example as in the structure shown in FIG. 7, which allows the deflection of a particle beam which propagates synchronously and with the same speed as the charge. In the latter case, the methodology shown differs from the disclosure provided in the publication Kar, S. et al., "Guided post-acceleration of laser-driven ions by a miniature modular structure", Nat. Comm. 7, 10792 (2016). In this publication, in fact, a single laser beam is used to accelerate a beam of charged particles by laser-matter interaction and as a result of the same interaction a neutralization current is obtained (due to the rapid positive charging of the same target) which fed a helix structure, in which a traveling wave allows to focus the previous beam of charged particles. In this case the structure is unique and "simply connected".

In the case described in the present application, the structure used is in fact different and consists of at least two discrete elements, which makes it of the "multiply connected" type. In the present case, the structure can be employed in the deflection (instead of focusing, as indicated in the Kar's document) of a particle beam which has been accelerated by a completely separate process. This acceleration can occur by classical methods or by laser-matter interaction. The important thing is that these two processes—acceleration and subsequent deflection—are completely separate and therefore separately tunable and optimizable, unlike in the case of the Kar's publication for the focusing effect.

The deflection method caused by a traveling charge wave of a particle beam accelerated by classical accelerators has already been reported in the literature in the documents to Di Giacomo and Consoli, but in these cases the generation of the charge impulse is carried out by a solid-state voltage generator, with obvious limitations as regards the maximum charge which can be deposited, the duration of the pulse as well as the impossibility of absolute synchronization of the charge pulse with the accelerated particle beam, if the acceleration occurs by laser-matter interaction.

The fields of application of the solution suggested here are: acceleration, deceleration, deflection, focusing, selection of accelerated charges in accelerators and sources of charged particles for scientific-academic-medical purposes, and for all those ranges of medical, biological and study applications, processing and characterization of materials, in order to use them in the electronic, avionics, spatial field . . . . These generated electromagnetic fields can also be effectively used for direct application in the medical, biological field when applied to cells, or for the characterization of materials and devices subjected to high transient fields, for studies of electromagnetic compatibility in general as well as in advanced structures which generate terahertz radiation.

The solution of charging a target due to the interaction with a high-energy laser has already been documented in scientific literature. The generation of electromagnetic fields and the related use of this charging phenomenon in the ways, for the purposes and with the methodologies set out herein is instead completely new, and this makes use of a study carried out through theoretical analysis supported by accurate numerical simulations and experimentation carried out on the generation of high charges on a target hit by the nanosecond pulses of the ABC laser of ENEA in Frascati.

The above description requires experimentation in the laboratory in order to identify the optimal features of the devices described. The suggested method then requires the development of prototypes with suitable parameters, which allow to make the described charge accumulation devices efficient and to produce an easily buildable and low-cost version.

Figure 2:
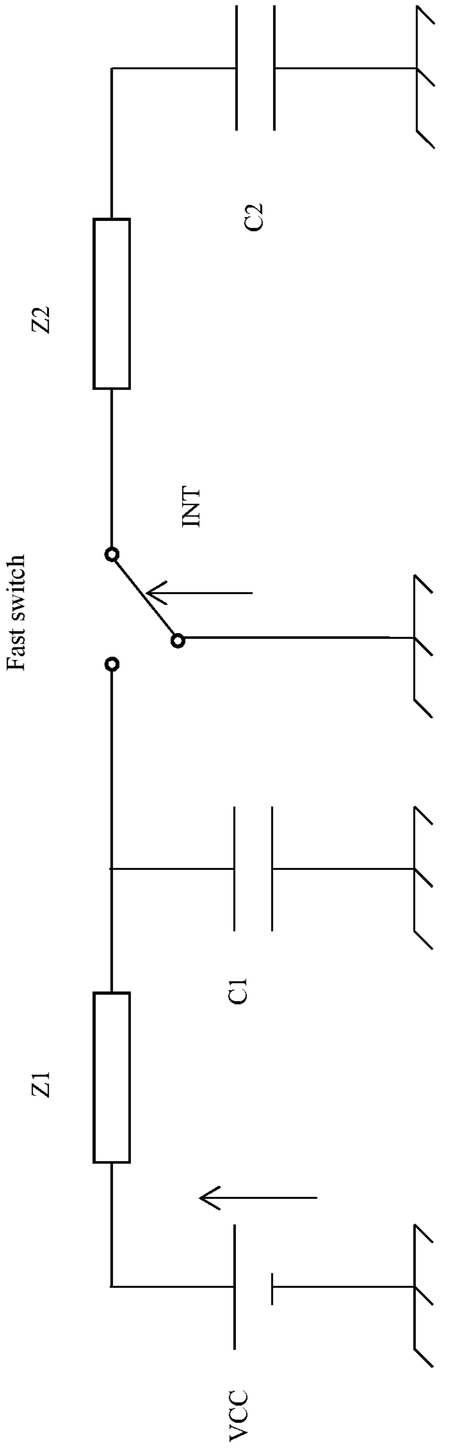
FIG. 2 shows a charge diagram of the Capacitor C2.

The solution described herein refers to a completely alternative method to that of providing the necessary charge by means of suitable voltage or current generators, or by means of the fast discharge of previously charged capacitors, as in the case in FIG. 2. The solution is based on the use of a high-intensity and power laser.

It is known from the documents to Atzeni and Macchi that the interaction of a high-intensity laser with a solid target generates a plasma and fast electrons associated therewith, which move away from the target in very short time. These electrons create a high-intensity local electric field, capable of accelerating the ions in turn. These ions are much slower than the electrons, and therefore once hit by the laser, the target—be it dielectric or conductor—globally shows a strong positive charge, which can decrease over time in some cases. It has been shown that the presence of such a sudden and high positive charge located at the point of laser-matter interaction can drive an electronic neutralization current through the target support, which is itself connected to the conductive vacuum chamber, as described in the documents to Dubois and Poye. The currents engaged in these cases have also been measured in the order of several kA, as described in:

Krása, J., et al., "Spectral and temporal characteristics of target current and electromagnetic pulse induced by nanosecond laser ablation", Plasma Phys. Control. Fusion 59, 065007 (2017), Cikhardt, J. et al., "Measurement of the target current by inductive probe during laser interaction on terawatt laser system PALS", Rev. Sci. Instrum. 85, 103507 (2014), Santos, J. J. et al., "Laser-driven platform for generation and characterization of strong quasi-static magnetic fields, New J. Phys. 17, 083051 (2015), Fujioka, S. et al., "Kilotesla magnetic field due to a capacitor-coil target driven by high power laser", Sci. Rep. 3, 1170 (2012), Law, K. F. F. et al., "Direct measurements of kilo-tesla level magnetic field generated with laser-driven capacitor-coil target by proton deflectometry", Appl. Phys. Lett. 108, 091104 (2016), and Tikhonchuk, V. T., Bally-Grandvaux, M., and Santos J. J., "Quasi stationary magnetic field generation with a laser-driven capacitor-coil assembly", Phys. Rev. E 96, 023202 (2017).

There have currently been attempts to use these currents to power solenoids, in order to create magnetic fields of around Gigagauss, as shown in Santos, Fujioka, Law, and Tickhonchuk.

Some diagrams consider that this current can be used in order to drive an electromagnetic wave which acts on the same beam of ions which are accelerated by the laser-matter interaction, in order to focus them as described in the Kar's document.

In other cases the electric field obtained from the charging of a target due to the rapid emission of electrons has been used to focus a beam of particles emitted by laser-matter interaction as described in the documents to Toncian and Borghesi.

The solution described herein is a completely complementary structure.

Figure 3:
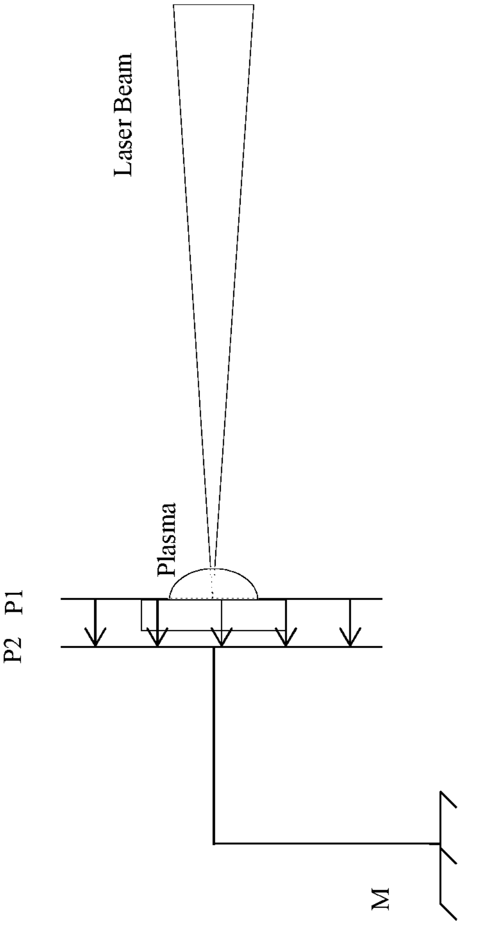
FIG. 3 shows a diagram of the device. In this example the normal incidence of the laser is indicated, but any other angle of incidence may be considered.

In the diagram in FIG. 3, the laser cuts on the conductive plate P1 at any angle with respect to the normal angle, positively charging it due to the fast departure of the electrons. In FIG. 3 the normal plane incidence was used as an example. If the plate P1 were directly connected to ground, as mentioned before, the positive charge left on this plate would draw thereto a high quantity of electrons coming from the conductive surface of the vacuum chamber (the mass to which the plate would be connected) and/or from all conductive surfaces of the objects closest to the plate P1.

A classic example of a short circuit of this plate on the conductive surface of the vacuum chamber occurs through the support thereof, which is generally conductive in many laser-matter interaction experiments. The aforementioned neutralization current is thus generated.

FIG. 3 describes a different configuration.

As occurs in a classic capacitor, the presence of the plate P2 in the immediate vicinity of the plate P1 causes an opposite-sign induced charge on P2 equal to that accumulated on the plate P1. The response speed of the system depends on the area of P1 and the distance between the two plates P1 and P2. This means that a current of electrons will still flow through the connection towards ground M of the plate P2. For this mechanism to be possible, the weight of the plate P1 must be supported with an adequate non-conductive support and P1 must be adequately far from ground M, with respect to the distance separating it from the plate P2. It is known that the charge accumulated on the plate P1 substantially depends on the features of the interaction between the laser and the plate P1 rather than on the shape thereof, and therefore on the overall conformation of the capacitor. Therefore, by changing the shape and distance of the two parallel plates P1 and P2, it is possible to have fields with profiles which are not necessarily spatially uniform. It is possible to obtain charges of around ten nC for laser pulses with 100 mJ of energy with Full Width Half Maximum (FWHM) of around ten femtoseconds, as described in the documents to Dubois and Poye. But high currents up to several kA have been found experimentally, which flow through the target support even in the case of laser pulses with FWHM of around 300 ps and with energies of several hundred joules, as evidenced in the documents to Krása, Cikhardt, Santos, Fujioka, Law, Tickhonchuk, and F. Consoli et al, EMP characterization at PALS on solid target experiments, Plasma Phys. Control. Fusion 60 (2018) 105006, which are the clear indication of a high charge accumulation even in these conditions.

Similar phenomena are at the basis of the generation of so-called "ElectroMagnetic Pulses" (EMPs), transient electromagnetic pulses of high intensity and duration up to hundreds of nanoseconds, which are known in all high-energy laser facilities, and are all the more important as the lasers used are of high energy and intensity, as explained in the documents to Dubois, Poye, and F. Consoli et al, "EMP characterization at PALS on solid target experiments". This charge accumulation phenomenon is therefore directly correlated to the energy and intensity of the laser being used. Charges of around several μC have been demonstrated in some cases, as described in the documents to Krása and Cikhardt when the laser energies are several hundred joules.

The charge on the plate P1 is generated in times which can even be around hundreds of femtoseconds, depending on the type of laser used, thus guaranteeing very low system response times, which cannot be obtained with the classical methods described above. The same is distributed at high speed over the entire plate P1, and the induction of the charge on P2 is therefore also very fast. So as to verify the functioning of the system thus created, electromagnetic simulations have been developed using CST Particle Studio software.

Figure 4:
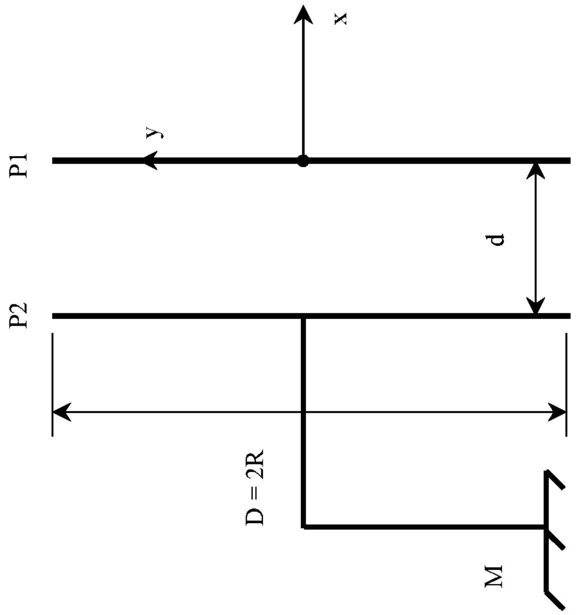
FIG. 4 shows a diagram of the structure and FIG. 5 shows the relative electric field simulation results, in various positions.

The simulated structure is that shown in FIG. 4, which also includes the conductive vacuum chamber containing the two plates P1 and P2.

The plates P1 and P2 are circular, with a thickness of 0.75 mm and a diameter D=2R of 20 cm, spaced apart from each other by a distance d=10 cm.

This structure is indicated as "Structure 1".

Figure 5:
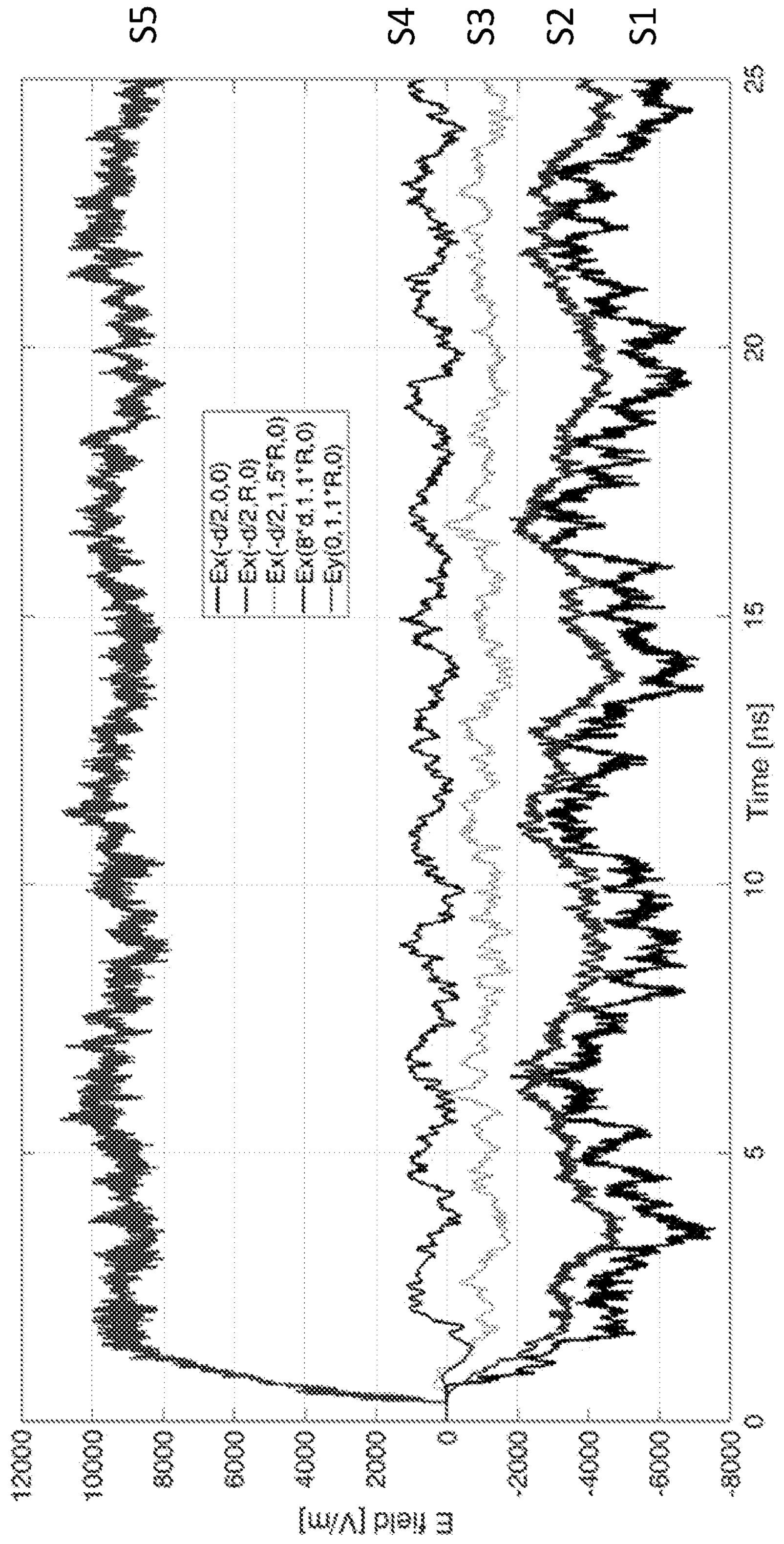

The electron charge is emitted with a Gaussian time profile. In particular, the initial instant of the simulation coincides with the Gaussian maximum, and the mean value thereof is obtained at 0.5 ns, for a total charge of 10 nC. A bunch of electrons are considered with an average energy of 100 keV and an energy spread of 100%, emitted in a cone of 40 degrees, within which the angular emission is uniform. The first signal S1 shown in FIG. 5 is the component of the electric field generated in the direction x on the point equidistant between the two plates P1 and P2 and in the axis of the same, that is, with coordinates Ex(−d/2; 0; 0). As can be seen, the signal S1 has a continuous and an oscillating component. These oscillations are due to the absence, in the simulation, of any dissipative element: the accumulation of charge created instantaneously on the plate P1 excites undamped oscillations in the LC circuit consisting of the capacitor and the conductive contact which connects the plate P2 to ground, which has an equivalent inductance L thereof.

In reality, the presence of a further resistive element R, depending on the construction features of the structure, will dampen these oscillations.

The signals S2 and S3 concern points placed more towards the end of the plate with coordinates Ex(−d/2; R; 0) and Ex(−d/2; 1.5R; 0), and the field gradually decreases. It is worth noting that the signal S4 Ex(8d; 1.1R; 0), although obtained outside the capacitor, is very attenuated with respect to the signal S1, but not zero. This is due to the extended spacing of the plates, which does not allow to completely neutralize the effect of the charge deposited on the plate P1. The signal S5 Ey(0; 1.1R; 0), represents the electric field value in the direction y and in the coordinate position (0; 110 mm; 0). It is the component of the electric field parallel to the surface and close to the edge thereof (the plate has a diameter of 200 mm), thus having a much higher intensity than the signal S1: in fact, it is known that the value of the electric field depends on the charge density, which on the edge of the plate is very high. It is also observed that the signal is hardly affected by the oscillations seen for the signal S1. This confirms that once the charge has been deposited on P1 it is stable, while that on P2 is affected by periodic variations due to the fact that part returns to the vacuum chamber through the short circuit, in a set of continuous oscillations, due to the inductive connection with the vacuum chamber, as described above. The possible damping by means of suitable resistors, as previously discussed, will reduce this phenomenon to almost eliminate it.

Figure 6:
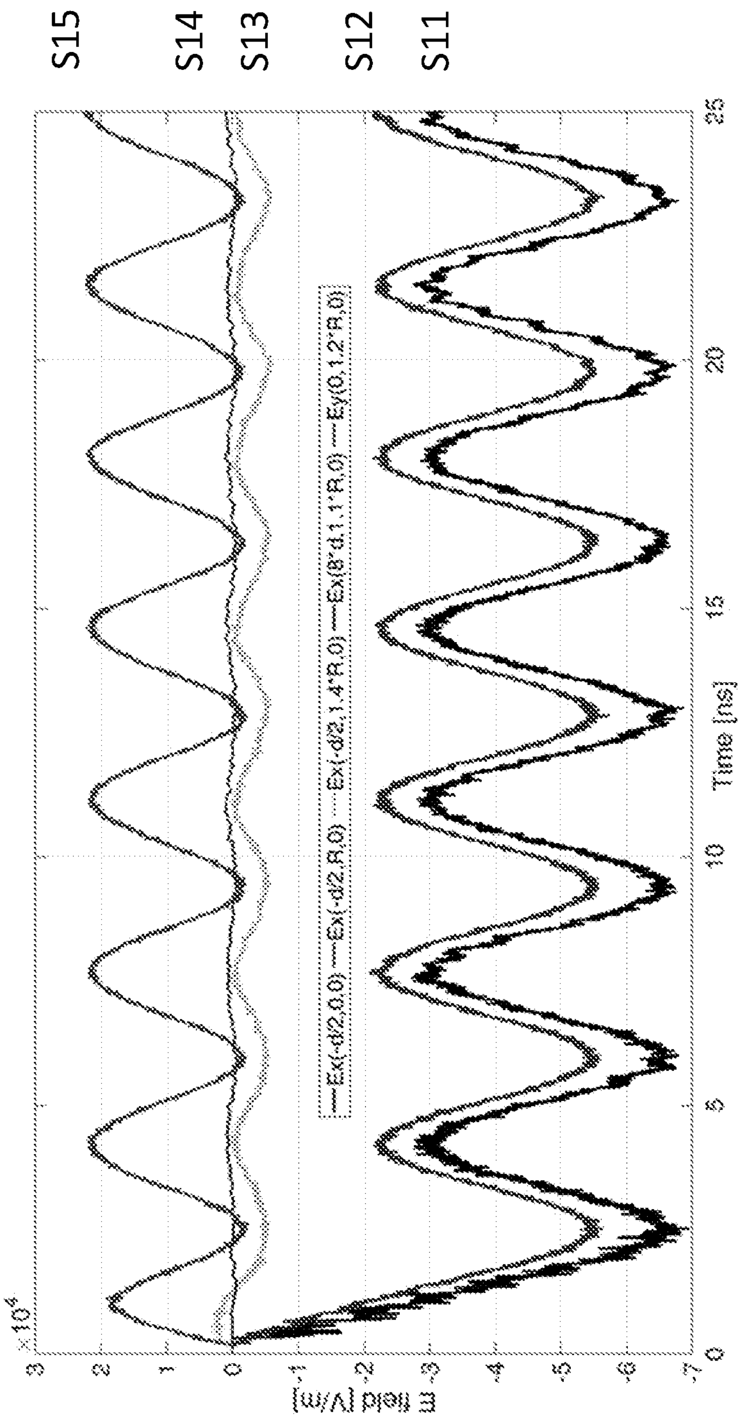
FIG. 6 shows the field simulation results, in the case of structure 2.

FIG. 6 shows the results of the simulations of the same structure where the plates are instead 100 mm in diameter and are placed 10 mm apart, with the same charge deposited on P1. In this case we refer to 'Structure 2'.

In this case it is observed that the field is much more intense and uniform inside the capacitor, in the median plane, while it is very attenuated outside the capacitor. In particular, the signal S11 represents the signal in the coordinates Ex(−d/2; 0; 0), the signal S12 in the coordinates Ex(−d/2; R; 0), the signal S13 in the coordinates Ex(−d/2; 1.4R; 0), the signal S14 in the coordinates Ex(8d; 1.1R; 0), and finally the signal S15 in the coordinates Ey(0; 1.2R; 0).

The proximity and extension between the plates P1 and P2 causes a compensation effect of the charges, which intensifies the internal field of the capacitor and reduces the external one. Furthermore, it is observed that the proximity of the two plates P1 and P2 causes the field to oscillate strongly even in the vicinity of the plate P1 (signal S15). Even in this case, the use of suitable resistive dissipators will allow the damping of these oscillations.

The charging times are very short, around 2 ns, and are linked to the conformation of the capacitor, but also to the emission duration of the electrons, considered in this case as an example equal to 0.5 ns.

For interactions with much shorter pulsed lasers (picoseconds or femtoseconds), the rise times are significantly reduced. Once the capacitor charge is obtained, it is possible to provide for the discharge in a simple manner by means of fast switches, which can be used to short-circuit the capacitor plates, using for example spark-gaps as described in the documents:

Brussard, G. J. H., Hendriks, J., "Photoconductive switching of a high-voltage spark gap", Appl. Phys. Lett. 86, 081503 (2005), Hendriks, J., Broks, B. H. P., van der Mullen, J. J. A. M., Brussaard, G. J. H., "Experimental investigation of an atmospheric photoconductively switched high-voltage spark gap", J. Appl. Phys. 98, 043309 (2005), and Schwarz, H. J., Hora H., edts., "Laser interaction and related plasma phenomena", (Plenum Press, 1971).

There are already very rapid spark-gap switches which have the ability to withstand currents of several tens of kA with voltages up to MV and response times of less than 100 ps, as shown by the three previous references. These switches can be activated by laser, which allows a very precise absolute synchronization with the initial laser pulse which had allowed the charge to be deposited on the capacitor. Thereby, on command, electric field pulses with fast rising and falling edges and the possibility of being periodic are obtained, using commercially available pulse train lasers for this purpose.

This method of creating electric fields on regions which can be of high area and volume, obtained by fast charging the plate P1 due to the ejection of electrons because of the laser-matter interaction, can be successfully applied to any type of accelerating-decelerating-deflecting structure of particle beams. As mentioned, this method allows the absolute synchronization of the post-acceleration and deflection process with that of the initial emission, if the latter is also obtained by laser-matter interaction. This synchronization is easily achieved by using the same laser seed to carry out both processes.

It is important to consider the case of a set of capacitors placed in series, the first of which is affected by the present sudden charge accumulation mechanism. In this configuration, once a certain charge is accumulated on the first capacitor, the same will be found in all those in series therewith. However, since the electric field depends on the charge density, according to the law:

$$E=Q/(S^{*}\varepsilon) \quad (1)$$

(with ε dielectric permittivity, Q accumulated charge and S plate area), it is possible to have, with a single laser shot on the plate of the first capacitor, a succession of structures the field of which has different intensity according to the different area of the plates (see FIG. 7), and also has different profiles according to the type and shape of the electrodes (spatially uniform field, non-uniform . . . ). If one of the series capacitors has a very small section, the field therein can also be considerably high. A "capacitor" which has electrodes with dimensions of a few millimeters can reach electric fields of several hundreds of MV/m and even of GV/m. In fact, from equation (1), if Q is equal to 1 μC, it would be enough to have plates ideally 12 mm in diameter to have a uniform field of 1 GV/m. And much higher fields can be obtained by decreasing the size. Electric fields of 140 GV/m could be obtained for plates of 1 mm in diameter. The limit in this regard is given by the vacuum breakdown phenomenon, which is dependent on the residual gas as well as on the electrode, in terms of the type of material used but also roughness and geometry. In any case, this breakdown takes some time to develop, and therefore a very high field can still be sustained, even if for time intervals which may be limited. On the other hand, it is possible that if the field obtained for one of the capacitors is not too high, it does not necessarily need to be kept under vacuum. In which case the connection with the contiguous capacitor, which is instead under vacuum because the laser-matter interaction will take place there, will be carried out through a high-current vacuum connection, of those which are easily found on the market.

This methodology so far discussed and applied to the series of capacitors allows to solve a known and important problem. Now suppose we have two capacitors C1 and C2 in series, with capacitance C1>>C2.

If the capacitor C1 was isolated, to charge it with a charge Q1 it would be enough to use a generator which maintains a voltage V1=Q/C1. However, by connecting C2 in series to C1, the series of the two capacitors is in fact an equivalent capacitor with a capacitance Ceq very close to C2.

The voltage generator, applied to the ends of the series of the two capacitors, must charge them simultaneously. With the same charge Q deposited, the voltage Veq applied to the series C1-C2 must be Veq=Q/Ceq≈Q/C2>>V1, i.e., a much higher voltage than in the previous case.

Figure 7:
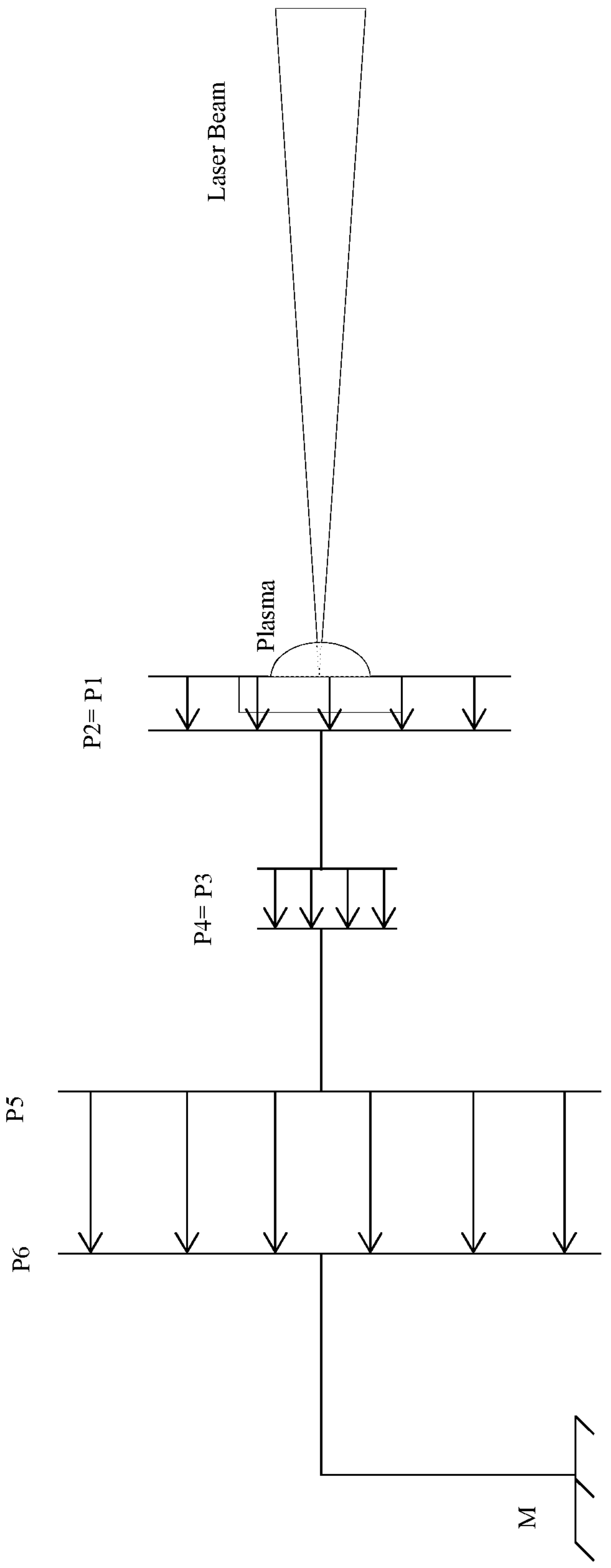
FIG. 7 shows a series of capacitors with different field profiles.

This problem is naturally solved by the configuration in FIG. 7. In this case, the charge is accumulated on the plate P1 and all the other plates of the two capacitors will charge accordingly with the same charge, removing the high voltage constraint which a hypothetical generator would have to provide to charge the capacitor cascade. The overall voltage will depend on the relative capacitances, and in particular on the smallest of the series capacitances. If all the capacitors were under vacuum, the voltage thereon could therefore also be very high.

High intensity laser-matter interaction is known to produce a wide range of radiation. For the described method to be effective, a considerable part of this radiation must not pass through the target being hit. To this end, it is possible that this target (represented here by the electrode P1) is also very thick, and made of a high-density material, such as lead. The most intense laser-matter interactions allow to obtain several hundred MeV of electrons and protons up to 100 MeV.

By properly choosing the material, thickness, and shape of the target P1, these particles can be stopped. The same can be said for X-rays, but it is possible that gamma rays (expected in scenarios with higher laser intensity, up to a few tens of MeV for the type of laser-matter interactions of interest for the project) could be difficult to attenuate or absorb. Since the X-gamma emission spectrum of the laser-matter interaction is strongly decreasing with the energy, the gamma rays energetic enough to pass the protection constituted by P1 will still be in very small numbers, and precisely because they are able to cross P1 they will interact very little with the rest of the structure. We therefore estimate that it is possible to provide an adequate screen for the whole series of capacitors represented by FIG. 7 for that which concerns the ionizing radiation produced by the laser-matter interaction which drives the process described herein.

This expedient allows the use of the method, for example in the biological field, for the application of these fields to live cells, or also to materials and devices, as stated below.

It is an interesting feature that these fields thus generated can be measured with relative ease by using intense electric field probes such as the D-Dot described in the document Edgel, W. R., "Primer on electromagnetic field measurements", Prodyn Application note, PAN 895, 1-14, or electro-optical probes described in the document F. Consoli et al, "Time-resolved absolute measurements by electro-optic effect of giant electromagnetic pulses due to laser-plasma interaction in nanosecond regime", Scientific Reports 6, 27889 (2016), and work patterns can be efficiently performed with existing or under-preparation high-powered repetitive lasers.

As previously described, if in the initial diagram in FIG. 3 it is considered that the plate P2 is connected to ground by means of a suitable resistor, the oscillations will be reduced, as in the classic RLC circuits, in connection with a rise time not optimized to be very small.

Instead, the introduction of inductive elements only involves the presence of strong sinusoidal oscillations, in connection with shorter rise times however. The introduction of tunable elements in this connection towards ground therefore allows to obtain the rise time performance of the electrostatic fields or the amplitude and frequency of any sinusoidal oscillations which can be changed as needed.

Thereby, the structure can be used to supply an electrostatic field with rapid creation/destruction or can be a sinusoidal oscillator with a high amplitude and appropriate frequency, in a manageable manner with relative ease.

Figure 8:
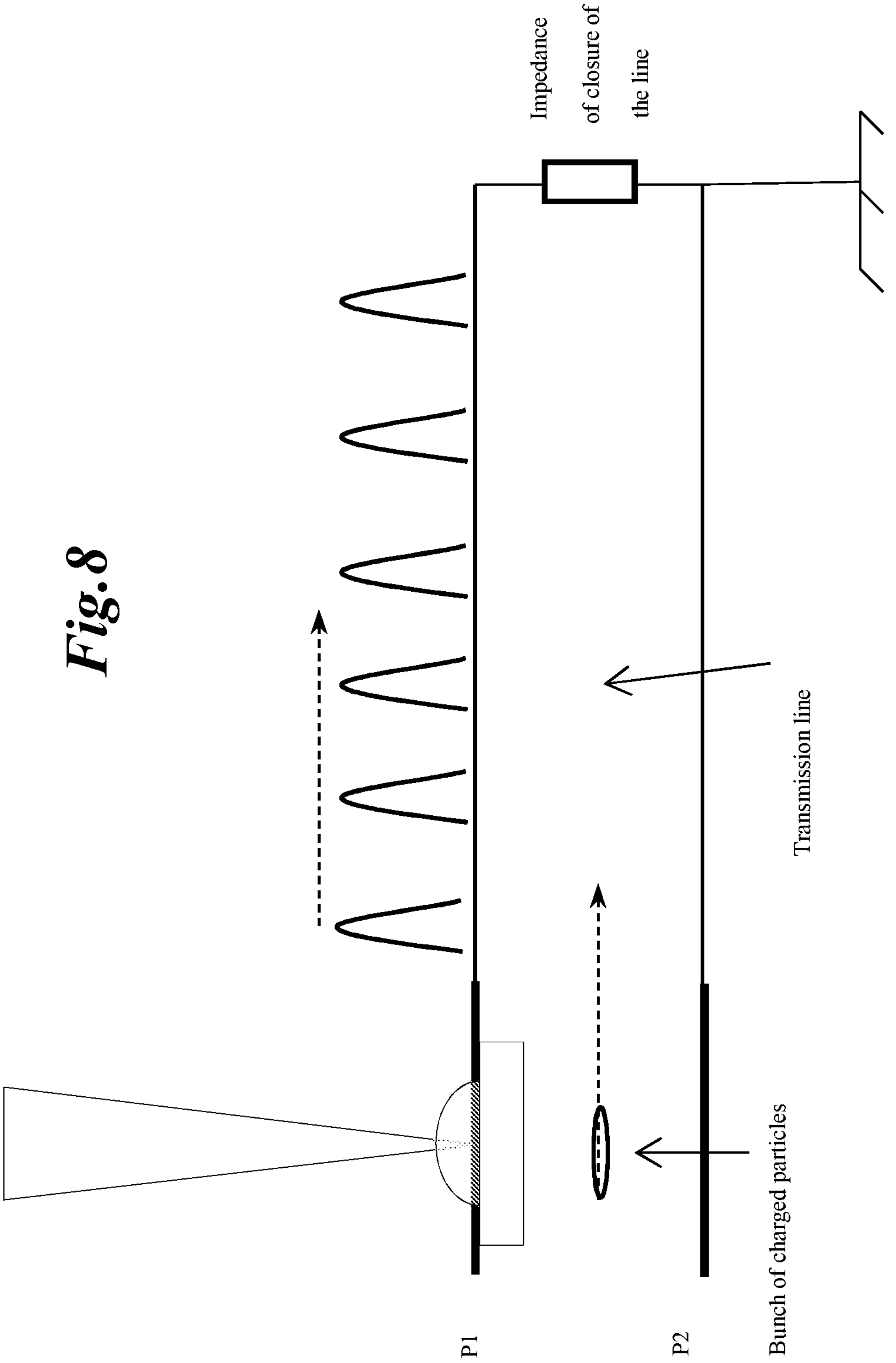
FIG. 8 shows a deflecting electromagnetic pulse in a closed transmission line in the characteristic impedance thereof.

A further use diagram of the methodology concerns the creation of charge pulses with a short time duration, which propagate as waves along a suitable transmission line, as in the diagram in FIG. 8.

The laser hits the plate P1, connected to a transmission line closed in the characteristic impedance thereof. Thereby, the bunch of charge Q1 which is created on the plate P1 propagates in the form of a pseudo-Gaussian pulse towards the end of the transmission line. At a certain instant, the bunch of charges Q1 will be in a particular point of the transmission line, and an associated electric field will be located there.

This is the principle of the advanced traveling wave deflection diagram of the High Energy Accelerated Particle Chopper, built for the Linac Spiral 2 in Ganil (France) and described in the documents Di Giacomo, Consoli "RF design of the power coupler for the SPIRAL2 Single Bunch Selector" and Consoli "Broadband electromagnetic characterization of a 100 ohm traveling-wave electrode by measuring scattering parameters". In fact, if a second bunch of high-energy charged particles Q2 travels parallel to the transmission line (shown in FIG. 8 at the center of the same) it will suffer the effect of the electric field due to the bunch Q1. If:

1) the transmission line is formed so as to have the phase velocity of the electromagnetic wave associated with the bunch P1 equal to the drift velocity of the bunch Q2, and
2) the two bunches are time synchronized, then the field due to the bunch Q1 will be temporally synchronized with the bunch Q2 for the whole duration of the propagation of both along the transmission line.

The field generated by Q1 will therefore affect Q2 for the entire crossing of the transmission line, deflecting Q2 in the meantime which moves therein. This technique is particularly efficient for high-energy Q2 bunches, where the classic capacitor deflector is not sufficiently effective. The difficulty, however, is to have bunches Q1 of high charge, short duration and periodically available. All features easily obtainable if this charge is obtained by the laser-matter interaction process described above.

Thereby, the described solution shows the versatility thereof for the generation of high-intensity electromagnetic fields which are stationary with rapid rise time, high intensity sinusoidal, and traveling wave.

This means using the laser-matter interaction as a source for the generation of high-intensity microwave-radiofrequency electromagnetic fields.

As applications, in addition to the acceleration/deceleration/deflection of particles in accelerators, this methodology can also be used in electrostatic spectrometers, where capacitor structures are used for energy selection. This means being able to activate or not activate an electrostatic spectrometer on command and at very fast times, as well as in a repetitive manner. Furthermore, if the generated charge is sent to a classic electrostatic lens structure, it is possible to obtain the focusing of a beam of charged particles as described in Szilagyi, M. "Electron and ion optics" (Plenum Press, 1988).

The peculiar and important features of field generation produced by this technique allow the use of the same in a range of further applications which can be very wide and multidisciplinary. In particular, such high-intensity transient electric fields with a wide spatial extension can be used for biological and medical studies when applied to cells, as illustrated in the document Pakhomov, A. G., Miklavčič D., Markov M. S., edts., "Advanced electroporation techniques in biology and medicine" (CRC Press, 2017), or for the characterization of materials and devices subjected to high transient fields as described in Gupta, K. M., Gupta, N., "Advanced electrical and electronics materials: processes and applications", (Wiley, 2015), Nalwa, H. S., edt. "Handbook of low and high dielectric constant materials and their applications", (Academic Press, 1999)

Ott, H. W., "Electromagnetic compatibility engineering", (John Wiley & Sons, 2009) or for general studies of electromagnetic compatibility, as explained in Ott, as well as in advanced structures, which generate terahertz radiation, as indicated in Houard, A, et al, A. "Strong Enhancement of Terahertz Radiation from Laser Filaments in Air by a Static Electric Field", Phys. Rev. Lett. 100, 255006 (2008) e in Singh, R. K., Kumar, S. & Sharma R. P., "Generation of electromagnetic waves in the terahertz frequency range by optical rectification of a Gaussian laser pulse in a plasma in presence of an externally applied static electric field", Contrib. Plasma Phys. 57, 252 (2017).

Of course, without prejudice to the principle of the invention, the construction details and the embodiments may widely vary with respect to the above description given by way of a mere example, without departing from the scope of the present invention.

The invention claimed is:

1. A method of generating electromagnetic fields, comprising the step of using the interaction between a laser source and a target, as a source for generating high-intensity electromagnetic fields, wherein said laser source is a high intensity and energy laser beam, and wherein in said target hit by the laser, a positive charge is generated, wherein said target has a structure comprising at least two discrete objects that are distinct and not connected one to each other and in which at least one of the two discrete objects is hit by a laser beam generated by said laser source and wherein said discrete object hit by a laser beam is not connected to ground, wherein at least one of the two discrete objects is a conductor, wherein the structure of the target is used to generate said electromagnetic fields, and wherein the structure of the target is used to obtain the acceleration or deceleration or deflection or focusing or selection of the moving charges that define a beam of charged particles, or even the whole of more than one of the preceding actions.

2. The method of generating electromagnetic fields according to claim 1, wherein the moving charges of said beam of charged particles on which the electromagnetic fields act has been accelerated by a laser-matter interaction which is different from that used to generate the electromagnetic fields, or by means of methods of accelerating particles which use other principles than the laser-matter interaction, and thus wherein the two processes of pre-acceleration and subsequent processing of the moving charges of said beam of particles are completely separate and therefore separately tunable and optimizable.

3. The method of generating electromagnetic fields according to claim 1, wherein said generated electromagnetic fields are with microwave-radiofrequency, wherein the frequency of the generated electromagnetic fields depends on the duration of the laser pulse used, and the material directly hit by the laser is a dielectric or a conductor.

4. The method of generating electromagnetic fields according to claim 1, wherein there is provided the step of introducing adjustable or tunable resistive R or inductive L element defining RLC networks used to connect to the ground the other discrete object not hit by a laser beam, to allow obtaining high-intensity electromagnetic fields which are stationary with a rapid rise time, in the regime of the nanoseconds, picoseconds or femtoseconds, comparable to the duration of the laser pulse used, or with a periodic time trend, or with a traveling wave.

5. The method of generating electromagnetic fields according to claim 1, wherein said high-intensity electromagnetic fields generated by means of the laser-matter interaction have rapid rise times, in the regime of nanoseconds or picoseconds or femtoseconds, comparable with the duration of the laser pulse used, wherein said rapid rise times are obtained due to the charging of a material of the target hit by a said high intensity and energy laser beam and to the extraction of electrons from the material of the target following the laser-matter interaction.

6. The method of generating electromagnetic fields according to claim 1, wherein by changing the shape and distance of the two separated discrete objects, it is possible to have fields with profiles with uniform and non-uniform spatial distributions.

7. The method of generating electromagnetic fields according to claim 1, wherein there is provided the step of using tunable resistive R or inductive L element defining RLC circuits used to connect to the ground the other discrete object not hit by a laser beam in order to obtain electromagnetic fields, from the aforesaid structures, with adjustable time features by acting on the values of the circuital elements used in said RLC circuits.

8. The method of generating electromagnetic fields according to claim 1, wherein there is provided the step of using the aforesaid structures in cascade in order to obtain electromagnetic fields in each structure which are synchronized with the other structures, but having an intensity and spatial profile which may be different.

9. The method of generating electromagnetic fields according to claim 1, wherein there is provided the step of using the electromagnetic fields generated for a set of applications in medicine, biology, studies on materials and devices, electromagnetic compatibility, or generation of terahertz radiation.

* * * * *